Figure 1B:
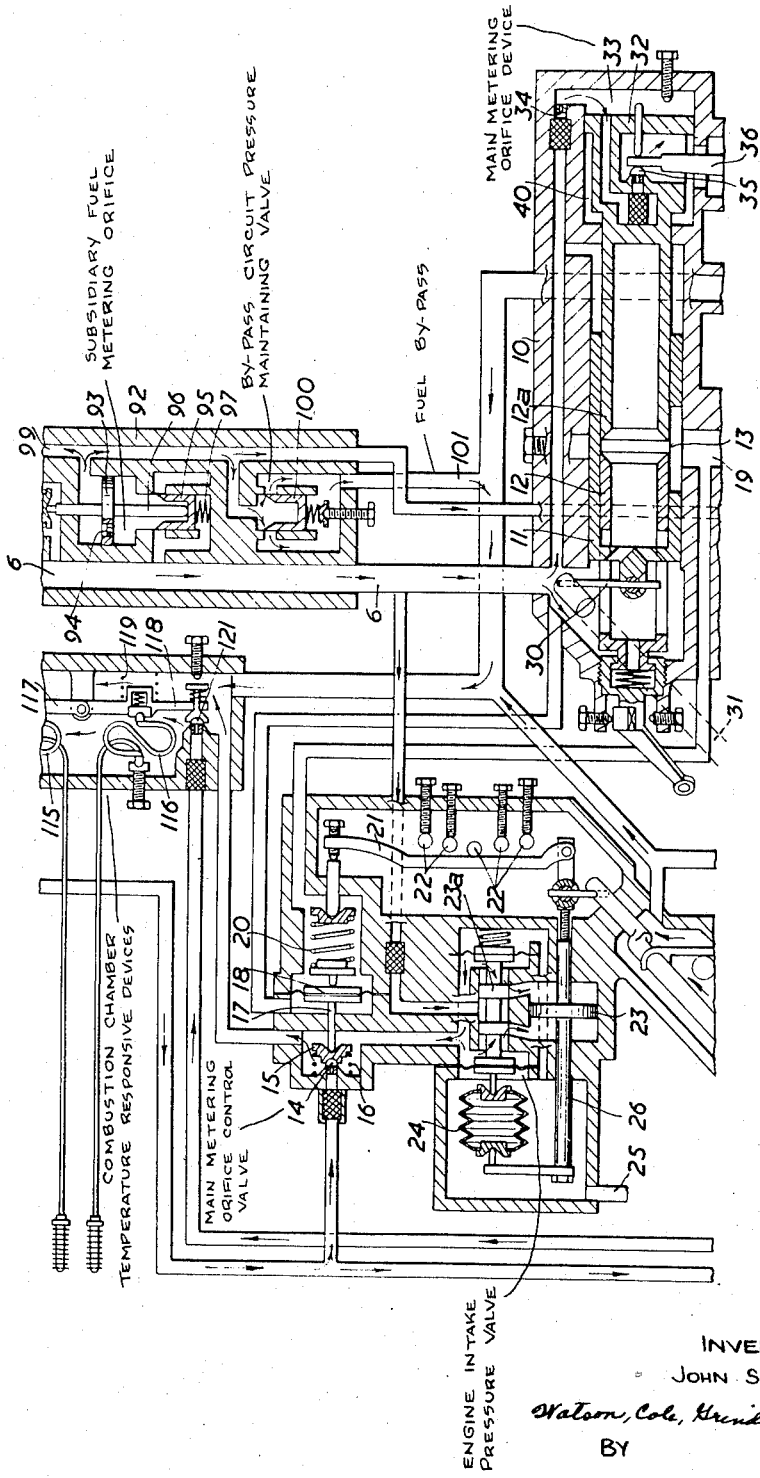

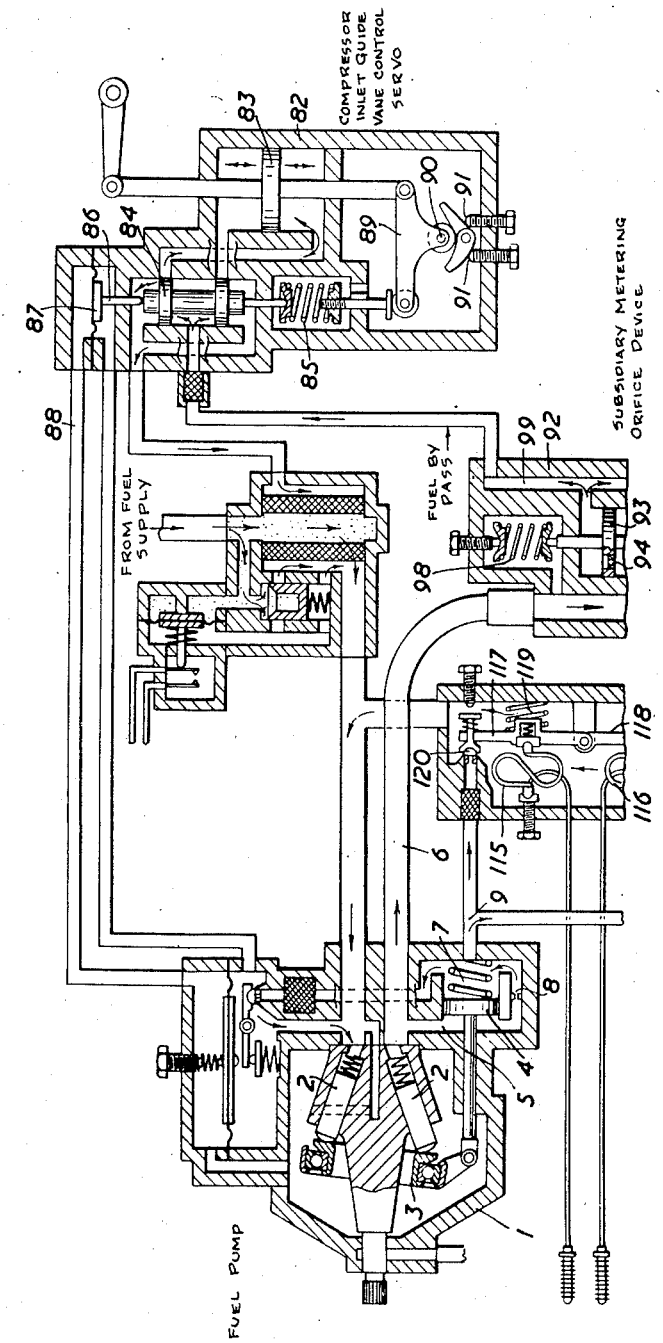

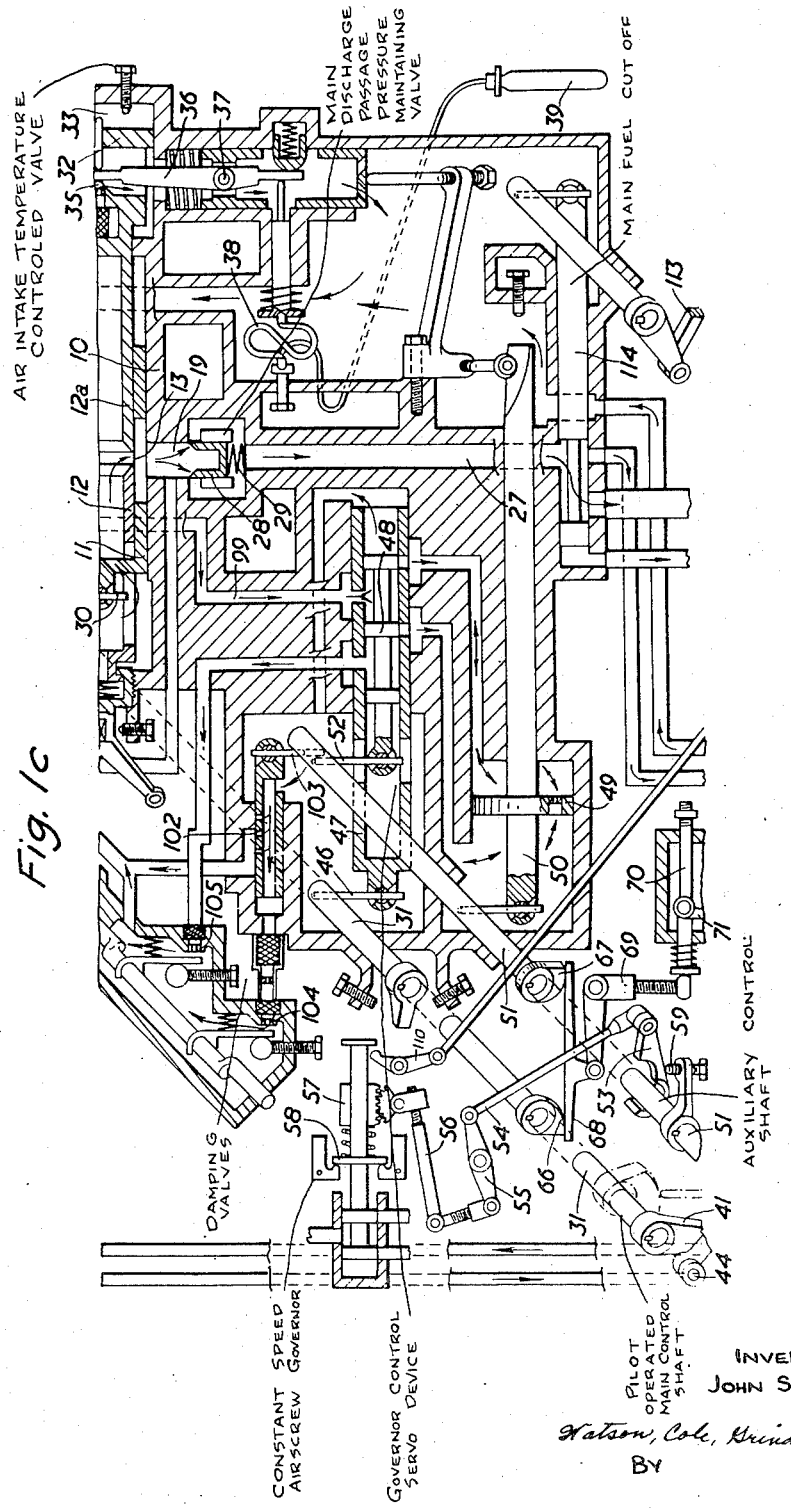

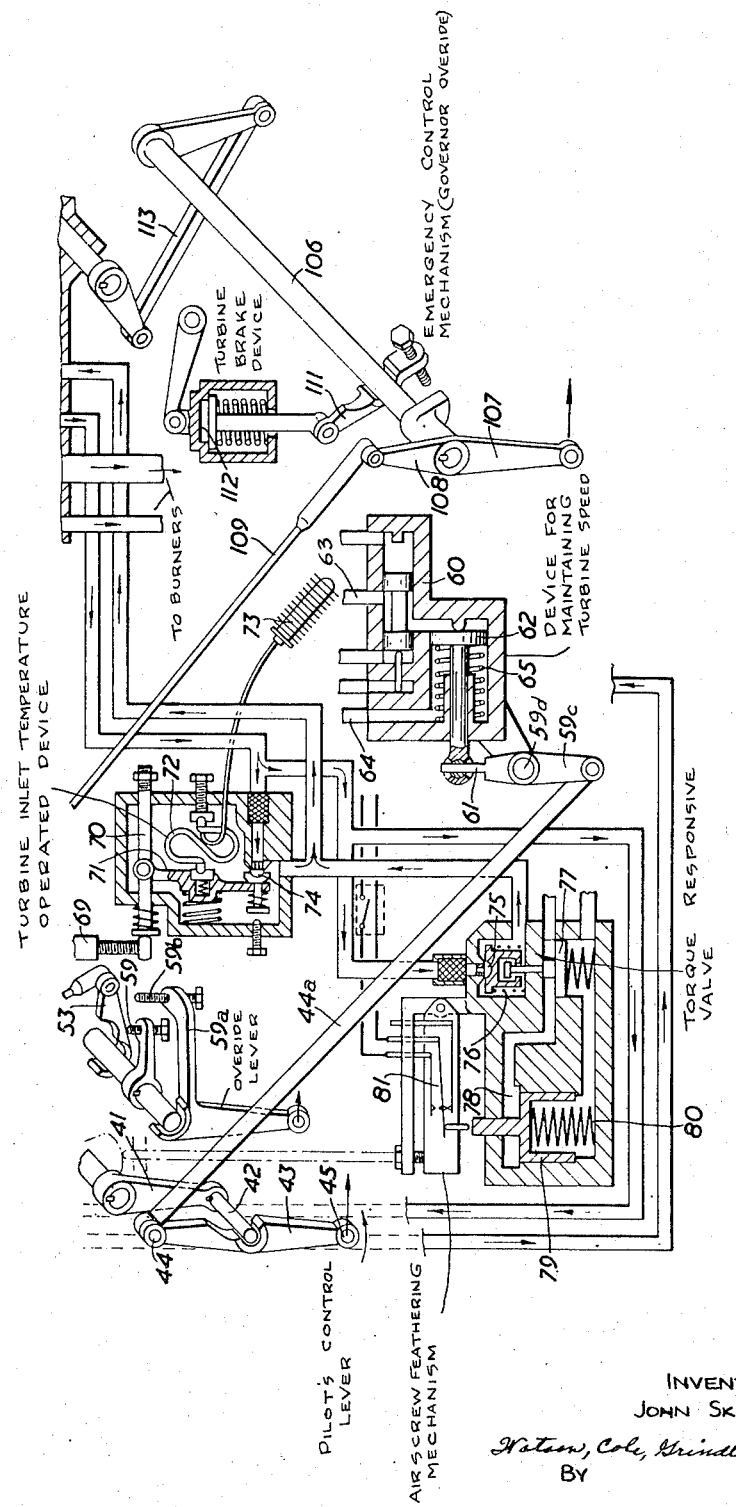

2,802,335
Patented Aug. 13, 1957

2,802,335

FUEL SUPPLY AND ASSOCIATED APPARATUS FOR COMBUSTION ENGINES

John Skellern, Northolt, England, assignor to D. Napier & Son Limited, London, England, a British company Application November 22, 1955, Serial No. 548,506

Claims priority, application Great Britain December 14, 1954

7 Claims. (Cl. 60—39.28)

This invention relates to fuel supply and associated apparatus for combustion engines of the combustion turbine or other type and of the kind comprising a pump arranged to be driven by the engine and to draw fuel from a source of fuel supply and deliver it to a delivery passage, a metering orifice device including a metering orifice (hereinafter called the main metering orifice) through which fuel flows from the delivery passage to the combustion chamber or chambers of the engine, pressure responsive means for maintaining a determined pressure drop across the main metering orifice and one or more hydraulic servo devices arranged to be operated by fuel under pressure derived from the delivery passage.

In apparatus of the above kind the means for maintaining the determined pressure drop across the metering orifice may be spill valve apparatus arranged to control the flow of fuel to the metering orifice and controlled by a pressure responsive device responsive to the difference in pressure respectively on the two sides of the metering orifice, or may be pressure responsive means responsive to the difference in pressure on the two sides of the metering orifice and arranged so to control the pump delivery, as by varying the effective stroke of a reciprocating fuel pump, as to maintain the determined pressure drop across the main metering orifice.

In any case, in apparatus of the kind referred to as at present used, the mechanism controlling the pressure drop across the main metering orifice has to operate to effect an adjustment whenever fuel delivered by the pump is absorbed by a servo device in order to make up for the loss of fuel from the delivery passage to the servo device or devices. Moreover, when such a servo device has to perform a comparatively large or sudden movement a correspondingly large or rapid adjustment of the mechanism controlling the pressure drop across the main metering orifice is required and since no such mechanism can operate instantaneously the fuel supply may be affected adversely during operation of a servo device or devices, while further, the size and permissible rate of movement of such servo device or devices is limited by the degree to which the adverse effect on the fuel supply to the engine, which operation of such devices occassions, can be tolerated.

It is an object of the present invention to provide a fuel supply apparatus of the kind referred to in which the operation of the servo device or devices will not affect the fuel supply to the engine nor be affected by the rate of fuel supply through the metering orifice and no adjustment of the mechanism controlling the pressure drop across the main metering orifice will be required when such device or devices come into operation.

Fuel supply apparatus of the kind referred to according to the present invention comprises a pump arranged to be driven by the engine and to draw fuel from a source of fuel supply and deliver it to a delivery passage, a main metering orifice device having a main metering orifice arranged to receive fuel from the supply passage, for delivery to the combustion chamber or chambers of the engine, means for maintaining a determined pressure drop across the main metering orifice, a by-pass circuit through which fuel from the delivery passage is continuously returned to the source of fuel supply, this by-pass circuit including a subsidiary metering orifice, (hereinafter referred to as the by-pass metering orifice) means for maintaining a constant pressure drop across such by-pass metering orifice and a pressure maintaining valve which maintains an appropriate pressure (hereinafter called the servo pressure) in a part of the by-pass circuit on the downstream side of the by-pass metering orifice and through which fuel can flow from the circuit back to the source of fuel supply, the fluid for operation of the servo device or devices being derived from the part of the by-pass circuit between the by-pass metering orifice and the pressure-maintaining valve, while the continuous flow into the by-pass circuit is sufficient to meet the demands of the servo device or devices.

Thus, when a servo device operates, a proportion of the fuel entering the by-pass circuit flows to it instead of flowing through the pressure-maintaining valve without affecting the volumetric rate of flow to this circuit from the delivery passage. Thus the setting of the pressure responsive mechanism, maintaining the determined pressure drop across the main metering orifice, whether it controls a valve or the volumetric rate of delivery from the pump, is unaffected by the coming into and out of operation of the servo device or devices since this setting always takes into account the volumetric rate of flow of fluid to the by-pass circuit and this volumetric rate of flow remains unchanged with the coming into and out of operation of the servo device or devices.

Moreover the arrangement provides for a servo pressure, that is to say the pressure maintained by the pressure maintaining valve between it and the by-pass metering orifice, which can be any selected pressure below the pressure usually termed the metering pressure, in the fuel delivery passage, which has to be relatively high in order to provide the necessary pressure at the fuel nozzles or the like by which the fuel is delivered into the combustion chamber or chambers of the engine. This has considerable practical advantages in that it correspondingly reduces the tendency for the parts subject to the servo pressure to be deformed by this pressure and thus cause the sticking of working parts due to such distortion, as well as reducing the difficulties in maintaining sufficiently fluid tight joints between working parts subject to the servo pressure.

One form of apparatus according to the invention suitable for a combustion turbine (hereinafter called the engine) driving a variable pitch air screw having associated with it the usual constant speed governor is shown diagrammatically by way of example in the accompanying drawing, in which Figures 1a, 1b, 1c and 1d taken together show a sectional elevation, with a small overlap between each figure.

The apparatus shown in the drawing comprises a fuel pump 1 of the variable capacity type arranged to be driven by the engine, this pump being, in the example shown, of the multi-cylinder reciprocating type with the pistons 2 operated by a tilting plate 3 against which they bear, the capacity of the pump being varied by altering the tilt of the plate. For this purpose the plate is connected to a piston 4 one face of which is subject through a passage 5 to the pressure in the delivery passage 6 of the pump while its other face is acted upon by a spring and is subject to the pressure in a chamber 7 which communicates with the passage 5 by way of a restricted orifice 8 and also communicates with a relief passage 9 leading to three relief valves hereinafter referred to, by which the relationship between the flow to and from the chamber 7 and hence the position of the piston 4 is controlled in such a known manner that the position of the piston, and hence the volumetric rate of delivery of the pump to the delivery passage 6 is controlled to suit requirements.

The delivery passage 6 of the pump communicates (Fig. 1b) with one side of a main metering orifice device 10 comprising a casing having a bore therein in which is slidably mounted a control sleeve 11 having within it two subsidiary control sleeves 12 and 12a. The control sleeve 11 has formed in it a slot 13 which cooperates with the adjacent ends of the sleeves 12 and 12a to constitute and control the effective cross sectional area of the slot 13 which constitutes the metering slot of the metering orifice device 10 in known manner. The arrangement is therefore such that the effective cross-sectional area of the slot 13 depends not only on the distance apart of the ends of the sleeves 12 and 12a, but also on the position of the sleeve 11 in relation to the casing 10.

The pressure drop across the metering slot 13 is controlled by one of the relief valves referred to above, namely the relief valve 14 which is controlled by an operating member 15 acted upon in one direction by a spring 16 and in the other direction by a rod 17 connected to a diaphragm 18, the opposite sides of which are subject respectively to the pressure in the delivery passage 6, that is to say the pressure on the upstream side of the metering slot 13 and to the pressure on the downstream side of this slot, that is to say in a passage 19 through which fuel is delivered to the burner or burners of the engine.

The diaphragm 18 is also subject to the pressure of a spring 20 having a moveable abutment the position of which is controlled by one end of a lever 21 having a series of adjustable alternative fulcra 22 so arranged that they come into effective use in turn as the lever 21 rocks. Thus for any given setting of the lever 21, the function of which will be hereinafter referred to, the diaphragm 18 acts through the rod 17 and the member 15 on the valve 14 in such manner that the pump 1 is controlled to maintain a constant pressure drop across the metering slot 13. The end of the lever 21 remote from that controlling the spring 20 is acted upon by the piston 23 of a hydraulic servo device the valve 23a of which is actuated by a capsule 24 subject to engine intake pressure through a passage 25, the end of the capsule 24 remote from the valve 23a being connected directly to the rod 26 of the piston 23. Thus changes in intake pressure acting on the capsule 24 produce corresponding changes in the position of the piston 23 and hence through the lever 21 of the pressure drop across the metering orifice 13.

The passage 19 communicates (Fig. 1c) with a main discharge passage 27, leading to the fuel nozzle or nozzles by way of a pressure-maintaining valve 28 comprising a piston the opposite faces of which are subject respectively to the pressure in the passage 19 and the combined forces of the pressure in the passage 27 and a spring 29, this back-pressure valve 28 serving to maintain a back pressure within predetermined limits in the passage 19.

The sleeve 11 is arranged to be operated by a lever 30 on a main control shaft 31 under the control of the pilot of the aircraft in which the power unit is installed. The sleeve 12a on the other hand is connected to the piston 32 of a servo device comprising the piston 32 one face of which is subject to the pressure in a chamber 33 to which fuel is admitted through a restricted orifice 34 from the delivery passage 6. The fuel thus admitted escapes through a relief valve 35 carried by the piston 32 and arranged to be actuated by one end of a lever 36 pivoted at 37, the other end of which is acted upon through a push rod by a temperature-responsive device 38 the bulb 39 of which is subject to the temperature in the air intake of the engine. The piston 32 is of the differential kind and is arranged so that the pressure in the chamber 33, if the valve 35 is closed, exerts a substantially greater force on the piston than the pressure in the chamber 40. It will thus be apparent that the piston 32 is always caused to occupy a position corresponding to the position of the adjacent end of the lever 36 and hence the temperature influencing the device 38.

The main control shaft 31 is arranged to be operated from the pilot's control lever through an arm 41 rigidly connected to one end of the shaft 31 and carrying a pivot pin 42 on which is pivotally mounted a lever 43 one end of which is pivoted at 44 to the adjacent end of a rod 44a while its other end is arranged to be connected at 45 to the pilot's control lever. Movement of the pilot's control lever therefore rocks the lever 43 about the pivot 44 and thus rocks the main control shaft 31.

The main control shaft 31 in addition to being connected to the sleeve 11 controlling the effective area of the metering orifice 13 is connected by an arm 46 to a sleeve 47 within which operates the control valve 48 of a hydraulic servo device, the piston 49 of which is connected by a piston rod 50 to an arm on a subsidiary control shaft 51 which, as shown, is connected by an arm 52 to the valve 48 so that, upon any movement of the main control shaft 31 and the corresponding movement of the sleeve 47 the piston 49 will be caused to move in a manner well known per se until the shaft 51 has been rocked into a position in which the valve 48 again occupies its neutral position relatively to the sleeve 47.

The auxiliary control shaft 51 carries a lever 53 connected by a link 54, a lever 55 and mechanism 56 to the control sleeve 57 of a constant speed governor 58 of known type driven by the engine and controlling the pitch of the blades of a hydraulic variable pitch constant speed air screw in a manner well known per se. The lever 53 is freely mounted upon the control shaft 51 and normally bears, by reason of the indirect action thereon of the spring of the governor 58 against an adjustable stop indicated at 59 rigid with the shaft 51 so that the position of the lever 53 relatively to the shaft 51 is normally determined by the position of the stop 59. An over-ride lever 59a carrying an adjustable operating member 59b is provided, however, through which, by means of an independent control, the lever 53 can be rocked away from the stop 59 to increase engine speed independently of the position of the main control shaft 31 and the auxiliary control shaft 51, for example in emergency.

The rod 44a is connected to a lever 59c pivoted at 59d and connected at 61 to a piston 62 of a hydraulic servo device 60 on which act differentially the pressures respectively in the oil passages 63 and 64 of the constant speed air screw control through which oil is delivered to the air screw when the pitch of the air screw is being respectively reduced and coarsened, the pressure which acts to reduce pitch also acting against a spring 65. The arrangement is such that if, during reduction of pitch, say on approaching to land, fine pitch stops come into operation in the air screw to prevent a further reduction in pitch, the oil pressure thus automatically built up in the appropriate oil passage 63 will move the piston 62 against the action of the spring 65 to maintain the appropriate engine speed and thus prevent the engine speed dropping to a point where a rapid opening up of the engine could not be achieved.

Associated with the main and subsidiary control shaft 31 and 51 is mechanism comprising cams 66 and 67 respectively on the two shafts acting on opposite ends of a lever 68 pivoted at an intermediate point in its length to one arm of a bell crank lever 69 the other arm of which acts through a rod 70 on one end of a lever 71. The lever 71 is pivoted at an intermediate point in its length to a temperature responsive device 72 the bulb 73 of which is subject to the turbine inlet temperature while the lever 71 acts at its other end on a valve 74 by which escape of fuel from the main fuel delivery passage 27 can take place if a predetermined temperature, dependent on the setting of the device is exceeded in the turbine inlet. Also associated with the main delivery passage 27 is a further relief valve 75 normally maintained closed by a spring 76 but capable of being opened by a control piston 77 the upper face of which is subject to an oil pressure, in a passage 78, from a torque responsive device, which varies with the torque being transmitted by the engine so that, if at any time this torque exceeds some predetermined value the piston 77 moves to open the valve 75 and thus reduce the quantity of fuel delivered to the nozzles through the main delivery passage 27. The pressure in the passage 78 also acts on a further control piston 79 against the action of a spring 80 the piston 79 having associated therewith electrical switch apparatus 81 controlling air screw feathering mechanism of known type and the arrangement being such that normally this feathering mechanism is out of operation but will be brought into operation to feather the air screw if at any time the pressure in the passage 78 drops to a value indicating that negative torque is being transmitted to the air screw.

Associated with the fuel supply apparatus is a hydraulic servo device 82 the piston 83 of which is arranged to control the angle of incidence of inlet guide vanes for the air entering the compressor of the engine. The valve 84 of the hydraulic servo device 82 is controlled jointly by a spring 85, and through an operating member 86 by a diaphragm 87 one face of which is subject to a pressure in a passage 88 created by the rotation of the parts of the pump 1 and therefore dependent upon the speed of the engine while its other face is subject to pump inlet pressure. The arrangement is such that the hydraulic servo device 82 controls the inlet guide vanes of the compressor over the lower end of the engine speed range in a manner depending upon the engine speed so as to increase the efficiency of the compressor over this lower speed range and reduce the risk of surging. As will be seen the effective force of the spring 85 is varied with movement of the piston 83 through a lever 89 the pivotal axis 90 of which is adjustable by means of adjusting members indicated at 91 so that the characteristics of the adjustment effected by the device 82 can be varied within limits.

Associated with the delivery passage 6 of the pump 1 is a subsidiary metering orifice device 92 comprising a piston 93 in which is formed a metering orifice 94 the pressure drop across which is maintained constant by a piston valve 95 acted upon by the rod 96 of the piston and by a spring 97 and controlling the inlet of fuel from the passage 6 to the underside of the piston 93. The pressure drop maintained across the metering orifice 94 can be varied by adjustment of an adjustable spring 98.

The fuel which flows through the metering orifice 94 flows into a passage 99 constituting the supply passage for the working fluid for the hydraulic servo devices 48—49 and 82 and a relief valve 100 is arranged between the passage 99 and a relief passage 101.

It will thus be apparent that, since a constant pressure drop is maintained across the orifice 94 during operation of the apparatus flow of fuel at a constant volumetric rate is maintained through the metering orifice 94, and, if neither of the servo devices 48—49 or 82 is in operation this fuel will flow to the relief passage 101 through the relief valve 100. The relief valve 100 is set however to open at such a pressure as to provide in the passage 99 a suitable pressure for operating the hydraulic servo devices 48—49 and 82. If and when, therefore, either of these devices operates, the flow of fuel through the metering orifice 94 will remain unaltered, but part of the fuel which would otherwise escape through the relief valve 100 is used to operate the servo device. The volumetric rate of flow of fuel to the main metering slot 13 is therefor entirely unaffected by operation of either of the servo devices mentioned.

The operation of the rod 70 through the levers 69 and 68 by the two cams 66 and 67 ensures that, on movement of the main control shaft 31 in a direction to increase engine speed, an initial adjustment of the temperature responsive device 72 takes place which allows, acceleration to take place without the devices 72 coming into effective operation, the subsequent follow up movement of the subsidiary control shaft 51 however completing the setting of the temperature responsive device 72 at the required value. This ensures that the temperature responsive device 72 will not come into operation wrongly during the interval between the operation of the main control shaft 31 and the follow up of the subsidiary control shaft 51 to effect the various adjustments of the control system.

The rate of flow or working fluid from the cylinder of the servo device 48—49 is controlled by damping valve apparatus. This damping valve apparatus comprises an adjustable valve, indicated at 102, the effective opening of which is controlled by the subsidiary control shaft 51 through a lever 103 and a valve 104 in parallel therewith and controlled by the servo piston 23, both the valves 102 and 104 being arranged to control the flow of operating fluid from the appropriate end of the working cylinder of the servo device 48—49 when the piston 46 moves in the direction to increase the engine speed, and a separate valve 105, also controlled by the servo device 23 and controlling the flow of operating fluid from the end of the working cylinder of the servo device 48—49 from which fluid flows when the piston 49 moves in a direction corresponding to a reduction in engine speed. It will thus be seen that the rate of movement of the piston 49 with increases in speed is controlled jointly in accordance with engine air intake pressure and the speed setting while the rate of corresponding movement during reductions in speed is controlled solely in accordance with the air intake pressure.

Emergency control mechanism is provided comprising a shaft 106 arranged to be operated by a lever 107 in emergency and connected by a lever 108 and rod 109 to a lever 110 for over-riding the constant speed governor 58, by a lever 111 to a turbine brake device 112 by which the turbine can be braked, and by mechanism 113 to a valve 114 by which the main fuel delivery passage 27 can be closed.

Temperature responsive devices 115, 116 subject to the temperature in the combustion chambers or at selected points in the path of the combustion products are provided and arranged to act through levers 117, 118 against springs 119, on relief valves 120, 121 controlling relief ports respectively in the passages 9 and 27 so as to reduce the delivery of the pump 1 and the supply to the fuel nozzles if the temperature at such selected points exceeds a value which is regarded as excessive.

In operation, therefore, fuel is pumped by the fuel pump 1 down the delivery passage 6 to be metered by the main metering orifice device 10 and is delivered via the pressure maintaining valve 28, past the main fuel cut off valve 114 to the burners. The pressure drop across the main metering orifice 13 is controlled by the relief valve 14, and the engine intake pressure acting through valve 23a, which both act to vary the capacity of the pump 1 and hence the pressure drop across the metering orifice.

The setting of the main metering orifice device 13 is controlled by the main control shaft 31 under the control of the pilot of the aircraft, but is also varied by the air intake temperature of the engine, through temperature response device 38.

Associated with the main control shaft 31 is an auxiliary control shaft 51, rotary movement being transmitted by the shaft 31, to the shaft 51 by means of the hydraulic servo device with valves 48, 49. The setting of the constant speed airscrew governor 58 is altered by movement of the shaft 51 when setting of the main metering orifice 13 is altered by the shaft 31. The above system may be overridden, however, by means of an independent control through override lever 59a.

The main control shaft is also caused to rotate by servo device 60 to prevent the engine speed dropping to a point where a rapid opening up of the engine could not be achieved.

A turbine inlet temperature device 72 is also associated with the two control shafts 31 and 51 to allow fuel to escape from the main fuel delivery passage 27 if the temperature in the turbine inlet is excessive for the particular setting of the main control orifice, and fuel is also bled from the passage 27 if the torque being transmitted to the engine is excessive, by the action of the relief valve 75. If at any time negative torque is transmitted to the airscrew the electrical switch apparatus 81 controlling the airscrew feathering mechanism will operate to feather the airscrew.

On movement of the main control shaft 31 in a direction to increase engine speed the arrangement is such that an initial acceleration is allowed to take place without device 72 coming into operation.

Movement of servo device 48—49 is damped by means of the damping valve apparatus with valves 102 and 104 so that the rate of movement of piston 49 with increases in speed is controlled jointly in accordance with engine air intake pressure and the speed setting while the rate of corresponding movement during reductions in speed is controlled solely in accordance with the air intake pressure.

The compressor inlet guide vane control device 82 operates according to the pressure created by the pump 1 i. e. according to engine speed, and draws its operating fluid from the by-pass circuit downstream of the subsidiary fuel metering orifice 94 of the subsidiary metering orifice device 92. This device 92 allows for a flow of fuel at a constant volumetric rate to be withdrawn from the passage 6 and provides by means of the pressure maintaining valve 100 a constant supply of operating fluid for the servo devices 48—49 and 82. If none of these devices are in operation, however, the excess fuel will flow away through the relief passage 101 and back to the fuel source so that the rate of fluid withdrawal from the passage 6 is constant regardless of whether the servo devices are in operation or not. The devices provides therefor a fuel by-pass from which the servo devices may be operated.

The emergency control mechanism operated by lever 107 overrides the governor 58, brakes the turbine through device 112, and closes the main fuel delivery passage 27.

If the temperature in the combustion chambers becomes excessive the devices 115, 116 operate to reduce the delivery capacity of the pump 1.

What I claim as my invention and desire to secure by Letters Patent is:

1. Fuel supply apparatus for a combustion turbine engine with at least one combustion chamber comprising a pump arranged to be driven by the engine and to draw fuel from a source of fuel supply and deliver it to a delivery passage, a main metering orifice device having a main metering orifice arranged to receive fuel from the supply passage for delivery to the combustion chamber or chambers of the engine, means for maintaining a determined pressure drop across the main metering orifice, a by-pass circuit through which fuel from the delivery passage can continuously return to the source of fuel supply, this by-pass circuit including a subsidiary metering orifice, means for maintaining a constant pressure drop across such subsidiary metering orifice, and a pressure-maintaining valve which maintains an appropriate pressure in a part of the by-pass circuit on the downstream side of the subsidiary metering orifice and through which fuel can flow from the circuit back to the source of fuel supply, and at least one hydraulic servo device, fluid for operation of which hydraulic servo device is derived from the part of the by-pass circuit between the subsidiary metering orifice and the pressure-maintaining valve while the continuous flow into the by-pass circuit through the subsidiary metering orifice is sufficient to meet the demands of the servo device.

2. Fuel supply apparatus for a combustion turbine engine as claimed in claim 1, including a governor for a constant speed air-screw, a main control member and a hydraulic servo device arranged to be controlled from the main control member and to control the governor for the constant speed air-screw.

3. Fuel supply apparatus as claimed in claim 2 wherein said hydraulic servo device has a working cylinder, and including damping action valve apparatus arranged to control the rate of working fluid flow from a working cylinder of the hydraulic servo device which controls said airscrew governor, and means by which the setting of such damping action valve apparatus is automatically varied with variations in the setting of the governor control.

4. Fuel supply apparatus as claimed in claim 3, in which the damping action valve apparatus provided to control the rate of flow of working fluid from the cylinder of the servo device includes valve means which effect control in a direction to increase the speed of the engine and the setting of which is dependent upon the speed range over which the variation in speed is being effected, and valve means which effect control in a direction to reduce the speed of the engine and the setting of which is independent of such speed range.

5. Fuel supply apparatus as claimed in claim 1, in which the combustion turbine engine is provided with a compressor having adjustable inlet guide vanes associated with the air intake thereof and in which the hydraulic servo apparatus includes a hydraulic servo device for controlling the setting of said adjustable inlet guide vanes.

6. Fuel supply apparatus as claimed in claim 2 including a temperature responsive device subject to the temperature at the inlet to the turbine of the engine and arranged to reduce the fuel supply to the engine at a predetermined temperature dependent upon its setting, and means for varying the setting of the temperature responsive device comprising a control member subject to the differential action thereon of two actuating members one of which is operated by the main control member also controlling the hydraulic servo device by which the governor is controlled while the other is operated by the piston of such servo device, the arrangement being such that on movement of the main control in a direction to increase engine speed an initial adjustment of the temperature-responsive device is effected such as will enable a permissible increase in temperature to occur without this device acting to reduce the supply of fuel to the engine, the subsequent movement of the piston of the servo device readjusting the setting of the temperature-responsive device to the final value appropriate to the increased engine speed selected.

7. Fuel supply apparatus as claimed in claim 6 including at least one additional temperature-responsive device subject to the temperature in a combustion chamber or at a selected point in the path of combustion products emanating therefrom and arranged to cause a reduction in the delivery of fuel to the combustion chamber or chambers if the temperature at such selected point rises above a predetermined value.

References Cited in the file of this patent

UNITED STATES PATENTS

| 2,354,634 | Griswold | July 25, 1944 |
| 2,594,689 | Sharp et al. | Apr. 29, 1952 |
| 2,685,334 | Davies | Aug. 3, 1954 |
| 2,759,549 | Best | Aug. 21, 1956 |